United States Patent
Koshizen

(10) Patent No.: US 11,260,858 B2
(45) Date of Patent: Mar. 1, 2022

(54) PREDICTION DEVICE, PREDICTION METHOD, AND STORAGE MEDIUM

(71) Applicant: HONDA MOTOR CO., LTD., Tokyo (JP)

(72) Inventor: Takamasa Koshizen, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 126 days.

(21) Appl. No.: 16/733,569

(22) Filed: Jan. 3, 2020

(65) Prior Publication Data

US 2020/0223433 A1 Jul. 16, 2020

(30) Foreign Application Priority Data

Jan. 11, 2019 (JP) .............................. JP2019-003844

(51) Int. Cl.
  *B60W 30/095* (2012.01)
  *G08G 1/16* (2006.01)
  *G06K 9/00* (2022.01)

(52) U.S. Cl.
  CPC ..... *B60W 30/0956* (2013.01); *G06K 9/00798* (2013.01); *G06K 9/00825* (2013.01); *G08G 1/166* (2013.01)

(58) Field of Classification Search
  CPC ........... G06K 9/00785; G06K 9/00825; G06K 9/00798; G05D 1/0251; G05D 1/0278; B60W 30/0956; G08G 1/166
  See application file for complete search history.

(56) References Cited

U.S. PATENT DOCUMENTS

| | | | | |
|---|---|---|---|---|
| 2013/0268174 | A1* | 10/2013 | Koshizen | G08G 1/00 701/96 |
| 2015/0302586 | A1* | 10/2015 | Fukata | G08G 1/167 382/103 |
| 2015/0321698 | A1* | 11/2015 | Fuehrer | G08G 1/162 701/41 |
| 2016/0272117 | A1* | 9/2016 | Kang | G08G 1/163 |
| 2017/0305418 | A1* | 10/2017 | Bae | B60W 30/08 |
| 2019/0103026 | A1* | 4/2019 | Liu | G06K 9/3233 |
| 2019/0113926 | A1* | 4/2019 | Sim | B60W 30/0956 |

(Continued)

FOREIGN PATENT DOCUMENTS

| | | |
|---|---|---|
| JP | 2003-019936 A | 1/2003 |
| JP | 2004-070743 A | 3/2004 |
| JP | 2013-105379 A | 5/2013 |

(Continued)

OTHER PUBLICATIONS

Translation of JP2003019936A (Year: 2003).*

(Continued)

*Primary Examiner* — Kenneth J Malkowski
(74) *Attorney, Agent, or Firm* — Carrier Blackman & Associates, P.C.; Joseph P. Carrier; William D. Blackman

(57) ABSTRACT

A prediction device includes a camera configured to repeatedly image a region ahead of a vehicle, an extractor configured to extract a region including other vehicles from each of a plurality of images repeatedly captured by the camera, and a predictor configured to predict that a traffic jam will occur in a road on which there is the vehicle on the basis of a change in the region extracted from each of the plurality of images by the extractor between the images.

7 Claims, 10 Drawing Sheets

(SCENE D)

(56) References Cited

U.S. PATENT DOCUMENTS

2019/0382018 A1* 12/2019 Garnault ......... B60W 60/00272
2020/0079380 A1*  3/2020 Yu .......................... G06N 3/088

FOREIGN PATENT DOCUMENTS

| JP | 2016-201059 A | 12/2016 |
| JP | 2017-130162 A | 7/2017 |
| WO | 2015/178195 A1 | 11/2015 |

OTHER PUBLICATIONS

Translation of JP2013105379A (Year: 2013).*
Office Action dated Nov. 17, 2020 issued over the corresponding Japanese Patent Application 2019-003844 with the English translation thereof.
Office Action, Notice of Allowance, dated Mar. 16, 2021, issued over the corresponding Japanese Patent Application 2019-003844 with the English translation thereof.

* cited by examiner

PREDICTION DEVICE, PREDICTION METHOD, AND STORAGE MEDIUM

CROSS-REFERENCE TO RELATED APPLICATION

Priority is claimed on Japanese Patent Application No. 2019-003844, filed Jan. 11, 2019, the content of which is incorporated herein by reference.

BACKGROUND

Field of the Invention

The present invention relates to a prediction device, a prediction method, and a storage medium.

Description of Related Art

A technology for detecting a sign of a traffic jam on the basis of changes in a current position and acceleration of a vehicle is known (see, for example, Japanese Unexamined Patent Application, First Publication No. 2016-201059).

SUMMARY

However, in the related art, since a sign of a traffic jam is detected using a position of a vehicle measured using a global navigation satellite system (GNSS), it is easy for a measurement error caused at the time of measurement of the position of the vehicle to have an influence on prediction accuracy of the traffic jam, and for a delay caused at the time of transmission of position information to have an influence on the prediction accuracy of the traffic jam. As a result, the occurrence of the traffic jam cannot be accurately predicted in some cases.

An aspect of the present invention provides a prediction device, a prediction method, and a storage medium capable of accurately predicting the occurrence of a traffic jam.

The prediction device, the prediction method, and the storage medium according to the present invention adopt the following configurations.

(1) A first aspect of the present invention provides a prediction device including: a camera configured to repeatedly image a region ahead of a vehicle; an extractor configured to extract a region including other vehicles from each of a plurality of images repeatedly captured by the camera; and a predictor configured to predict that a traffic jam will occur in a road on which there is the vehicle on the basis of a change in the region extracted from each of the plurality of images by the extractor between the images.

According to an aspect (2), in the prediction device according to (1), when an image is input, the extractor inputs each image repeatedly captured by the camera to a model learned to output a parameter regarding a region in which there is the vehicle in the input image, and extracts the region from each image repeatedly captured by the camera on the basis of the parameter output by the model to which the image has been input.

According to an aspect (3), in the prediction device according to the aspect (1) or (2), the predictor performs spectrum analysis on the change in the region between images to derive a power spectrum from the change in the region between images, and predicts that the traffic jam will occur on the road on the basis of a change in strength of the power spectrum according to a frequency.

According to an aspect (4), in the prediction device according to the aspect (3), the predictor predicts that it is easy for the traffic jam to occur on the road when the attenuation of the strength of the power spectrum according to the frequency is an attenuation greater than 1/f fluctuation, and predicts that it is difficult for the traffic jam to occur on the road when the attenuation of the strength of the power spectrum according to the frequency is an attenuation smaller than 1/f fluctuation.

(5) Another aspect of the present invention is a prediction device including: a camera configured to repeatedly image a region ahead of a vehicle; an extractor configured to extract a first region including a first other vehicle present in a first lane, the first lane being the same as that of the vehicle, and a second region including a second other vehicle present in a second lane adjacent to the first lane from each of a plurality of images repeatedly captured by the camera; and a predictor configured to predict that a traffic jam will occur in a road on which there is the vehicle on the basis of a change in the first region extracted from each of the plurality of images by the extractor between the images and a change in the second region extracted from each of the plurality of images by the extractor between the images.

According to an aspect (6), in the prediction device according to the aspect (5), the predictor performs spectrum analysis on the change in the first region between the images to derive a first power spectrum from the change in the first region between the images, performs spectrum analysis on the change in the second region between the images to derive a second power spectrum from the change in the second region between the images, and predicts that the traffic jam will occur on the road on the basis of a strength of the first power spectrum according to the frequency and a strength of the second power spectrum according to the frequency.

(7) Another aspect of the present invention is A prediction method including: extracting, by a computer mounted in a vehicle including a camera configured to repeatedly image a region ahead of the vehicle, a region including other vehicles from each of a plurality of images repeatedly captured by the camera; and predicting, by the computer, that a traffic jam will occur in a road on which there is the vehicle on the basis of a change in the region extracted from each of the plurality of images between the images.

(8) Another aspect of the present invention is a computer-readable non-transitory storage medium storing a program, the program causing a computer mounted in a vehicle including a camera configured to repeatedly image a region ahead of the vehicle to: extract a region including other vehicles from each of a plurality of images repeatedly captured by the camera; and predict that a traffic jam will occur in a road on which there is the vehicle on the basis of a change in the region extracted from each of the plurality of images between the images.

According to any one of the above aspects, it is possible to accurately predict that a traffic jam will occur.

DESCRIPTION OF EMBODIMENTS

Hereinafter, embodiments of a prediction device, a prediction method, and a storage medium of the present invention will be described with reference to the drawings.

First Embodiment

[System Configuration]

Figure 1:
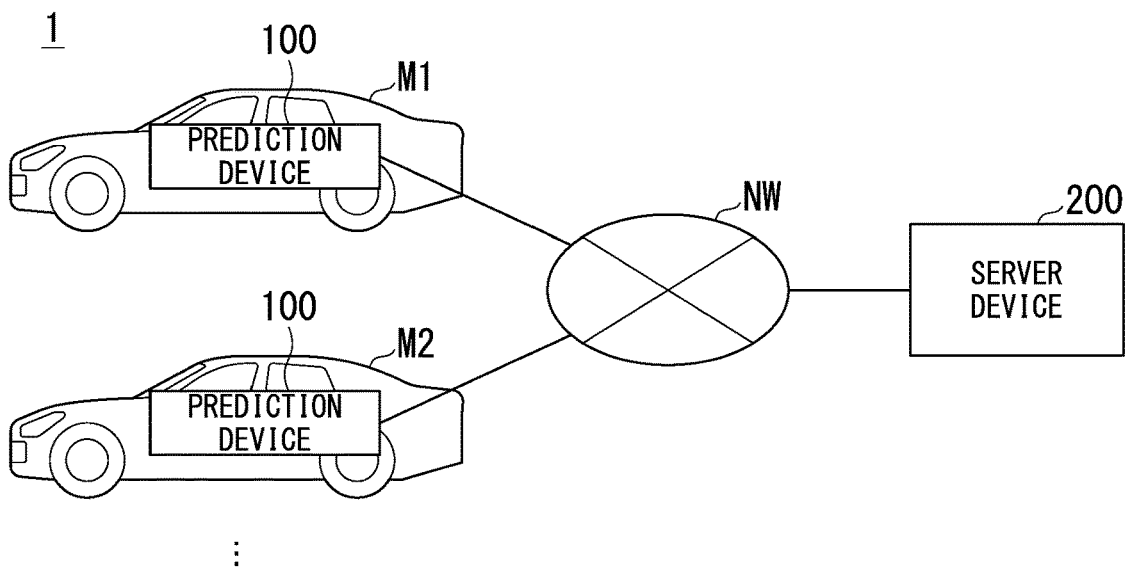
FIG. 1 is a diagram showing an example of a configuration of a prediction system including a prediction device according to a first embodiment.

FIG. 1 is a diagram showing an example of a configuration of a prediction system 1 including a prediction device 100 according to a first embodiment. The prediction system 1 according to the first embodiment includes, for example, a plurality of prediction devices 100 and a server device 200. Each prediction device 100 is mounted in a vehicle M, as in the shown example. The vehicle M is, for example, a vehicle such as a two-wheeled, three-wheeled, or four-wheeled vehicle. A driving source thereof is an internal combustion engine such as a diesel engine or a gasoline engine, an electric motor, or a combination thereof. The electric motor is operated using power generated by a generator connected to the internal combustion engine, or discharge power of a secondary battery or a fuel cell.

The prediction device 100 and the server device 200 are communicably connected via a network NW. The network NW includes a local area network (LAN), a wide area network (WAN), and the like. The network NW may include, for example, a network using wireless communication such as Wi-Fi or Bluetooth (registered trademark, which will be omitted hereinafter).

The prediction device 100 is a device that predicts the occurrence of a traffic jam on a road in which the vehicle M is present by analyzing an image obtained by imaging a region ahead of the vehicle M.

The server device 200 communicates with the prediction device 100 mounted on each vehicle M and collects data indicating a prediction result of a traffic jam from the prediction device 100. The server device 200 performs control to curb the occurrence of the traffic jam on the basis of the collected data. For example, the server device 200 alleviates the traffic jam by temporarily guiding vehicles traveling around a point at which the traffic jam is predicted to occur by a large number of prediction devices 100 to a service area or a parking area. The server device 200 may temporarily close, for example, a rampway connected to a road including a point at which a traffic jam has been predicted to occur, thereby reducing the number of vehicles flowing into a road in which the traffic jam may occur. The server device 200 may remotely control the vehicles traveling around the point at which the traffic jam is predicted to occur, thereby limiting a speed of the vehicles or curbing a lane change.

[Configuration of Prediction Device]

Figure 2:
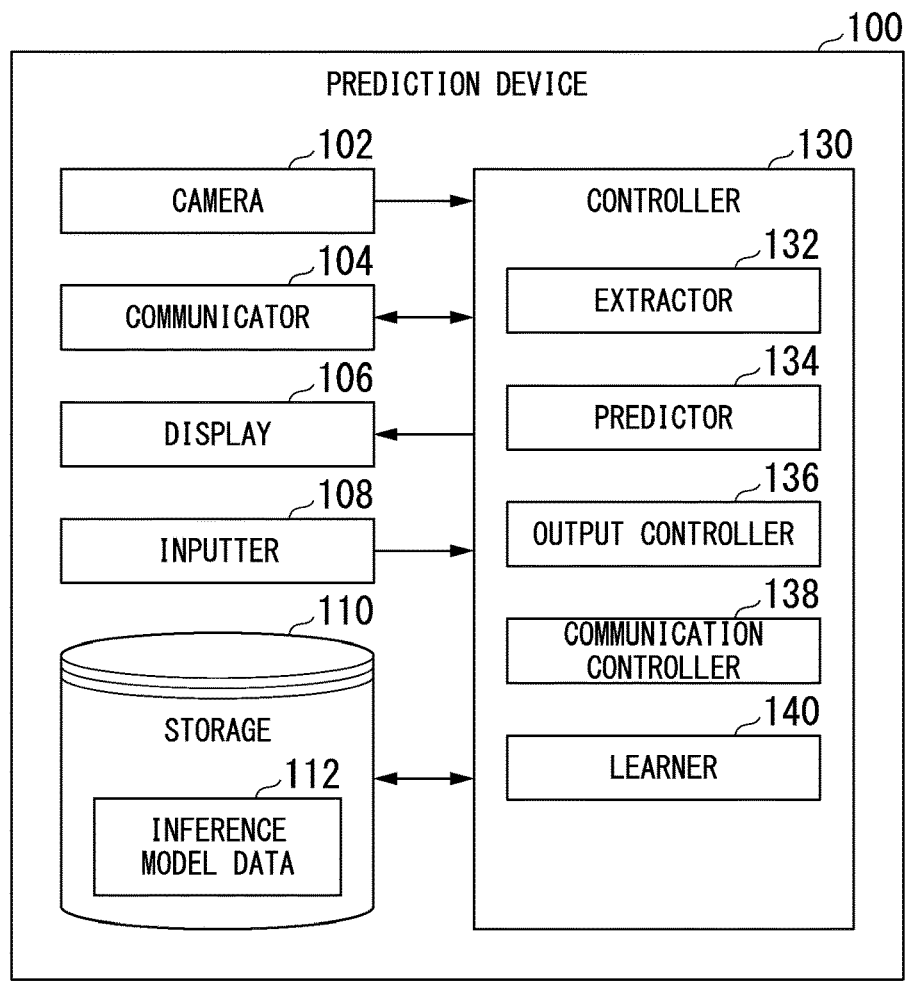
FIG. 2 is a diagram showing an example of a configuration of a prediction device according to the first embodiment.

FIG. 2 is a diagram showing an example of a configuration of the prediction device 100 according to the first embodiment. The prediction device 100 according to the first embodiment includes, for example, a camera 102, a communicator 104, a display 106, an inputter 108, a storage 110, and a controller 130.

These devices and equipment may be connected to each other by a multiple communication line such as a controller area network (CAN) communication line, a serial communication line, a wireless communication network, or the like. The configuration of the prediction device 100 shown in FIG. 2 is merely an example, and part of the configuration may be omitted, or another configuration may be added.

The camera 102 is, for example, a digital camera using a solid-state imaging element such as a charge coupled device (CCD) or a complementary metal oxide semiconductor (CMOS). The camera 102 repeatedly images a region ahead of the vehicle M (hereinafter referred to as a host vehicle M) in which the prediction device 100 has been mounted, through a front window of the host vehicle M. For example, the camera 102 may repeatedly perform imaging at a predetermined cycle, or may repeatedly perform imaging each time the host vehicle M travels a predetermined distance. The camera 102 generates data of a captured image (hereinafter referred to as image data), and outputs the generated image data to the controller 130.

The communicator 104 includes a communication interface such as an antenna or a network interface card (NIC). The communicator 104 communicates with the server device 200 or the like via the network NW.

The display 106 includes a display device such as a liquid crystal display (LCD) or an organic electroluminescence (EL) display. The display 106 displays an image on the basis of information output from the controller 130.

The inputter 108 is, for example, a user interface such as a button, a keyboard, or a mouse. The inputter 108 receives a user operation and outputs a signal according to the received operation to the controller 130. The inputter 108 may be a touch panel configured integrally with the display 106.

The storage 110 is realized by, for example, an HDD, a flash memory, an electrically erasable programmable read only memory (EEPROM), a read only memory (ROM), or a random access memory (RAM). Programs to be referred to by a processor, and inference model data 112, for example, are stored in the storage 110.

The inference model data 112 is information (a program or a data structure) that has defined an inference model MDL for extracting a bounded vehicle region (hereinafter referred to as a bounding box (BB)) from an image.

Figure 3:
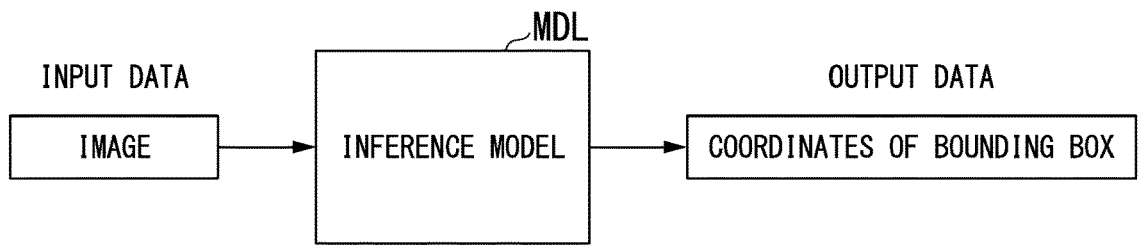
FIG. 3 is a diagram showing an example of an inference model.

FIG. 3 is a diagram showing an example of the inference model MDL. As in the shown example, the inference model MDL is a model learned to output coordinates of the bounding box BB in an image when the image is input.

The inference model MDL may be realized using, for example, a deep neural network (s) (DNN) including a convolutional neural network (CNN) or the like. The inference model MDL is not limited to the DNN, but may be realized by other models such as a logistic regression, a support vector machine (SVM), a k-nearest neighbor algorithm (k-NN), a decision tree, a naive Bayes classifier, or a random forest.

When the inference model MDL is realized by the DNN including the CNN or the like, the inference model data 112 includes, for example, coupling information on how units included in each of an input layer, one or more hidden layers (intermediate layers), and an output layer that constitute each DNN included in the inference model MDL are coupled to each other, and weight information on how many coupling coefficients are imparted to data that is input and output between the combined units. The coupling information includes, for example, information for designating the number of units included in each layer or a type of unit that is a coupling destination of each unit, and information on, for example, an activation function of realizing each unit or a gate provided between units on the hidden layer. The activation function may be, for example, a function (a rectified linear unit (ReLU) function, an exponential linear units (ELU) function, or the like) of switching operations according to an input code, may be a sigmoid function, a step function, or a hyperbolic tangent function, or may be an identity function. The gate, for example, selectively passes or weights data that is transferred between the units, according to a value (for example, 1 or 0) replied by the activation function. The coupling coefficient includes, for example, a weight that is imparted to output data when data is output from a unit of a certain layer to a unit of a deeper layer on a hidden layer of a neural network. The coupling coefficient may include a unique bias component of each layer.

The controller 130 includes, for example, an extractor 132, a predictor 134, an output controller 136, a communication controller 138, and a learner 140.

These components are realized, for example, by a processor such as a central processing unit (CPU) or a graphics processing unit (GPU) executing a program (software). Some or all of these components may be realized by hardware (including circuitry) such as a large scale integration (LSI), an application specific integrated circuit (ASIC), or a field-programmable gate array (FPGA) or may be realized by software and hardware in cooperation. The program may be stored in the storage 110 in advance or may be stored in a detachable storage medium such as a DVD or a CD-ROM and installed in the storage 110 by the storage medium being mounted in a drive device such as a disc drive.

The extractor 132 extracts the bounding box BB from each of a plurality of images repeatedly captured by the camera 102.

For example, the extractor 132 inputs the image captured by the camera 102 to the inference model MDL indicated by the inference model data 112. Specifically, the extractor 132 inputs a matrix having elements corresponding to a plurality of pixels included in the image, to the inference model MDL. When an image is input, the inference model MDL outputs the coordinates of the bounding box BB on the image. The coordinates of the bounding box BB are, for example, coordinates of two paired vertices that do not share sides with each other among four vertices when a region of the bounding box BB has a rectangular shape. When the coordinates of two paired vertices are output by the inference model MDL, the extractor 132 extracts the bounding box BB from the image on the basis of the coordinates of the two paired vertices. The coordinates of the paired vertices of the bounding box BB are an example of "parameters regarding the region in which there is the vehicle".

Figure 4:
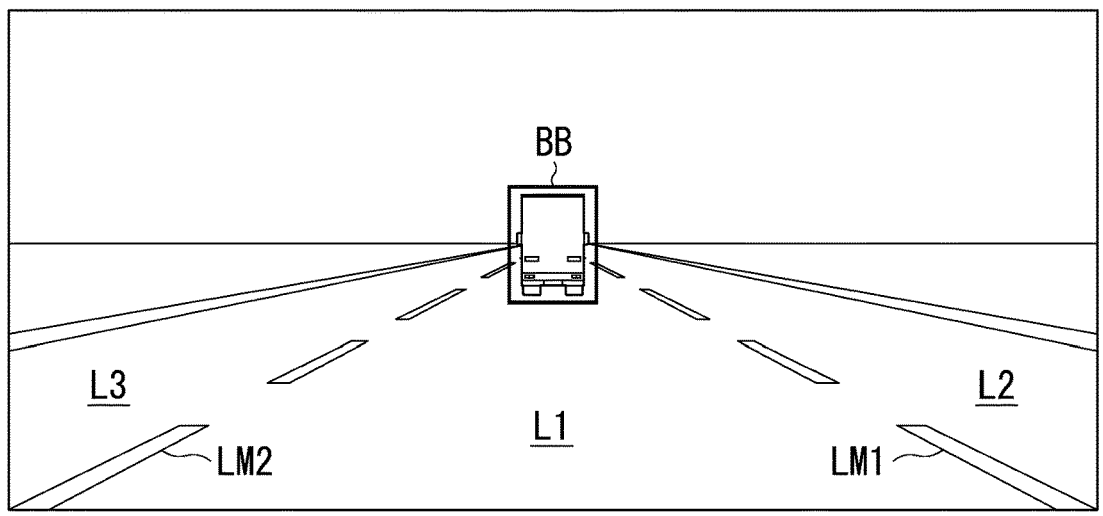
FIG. 4 is a diagram showing an example of an image from which a bounding box has been extracted.
Figure 5:
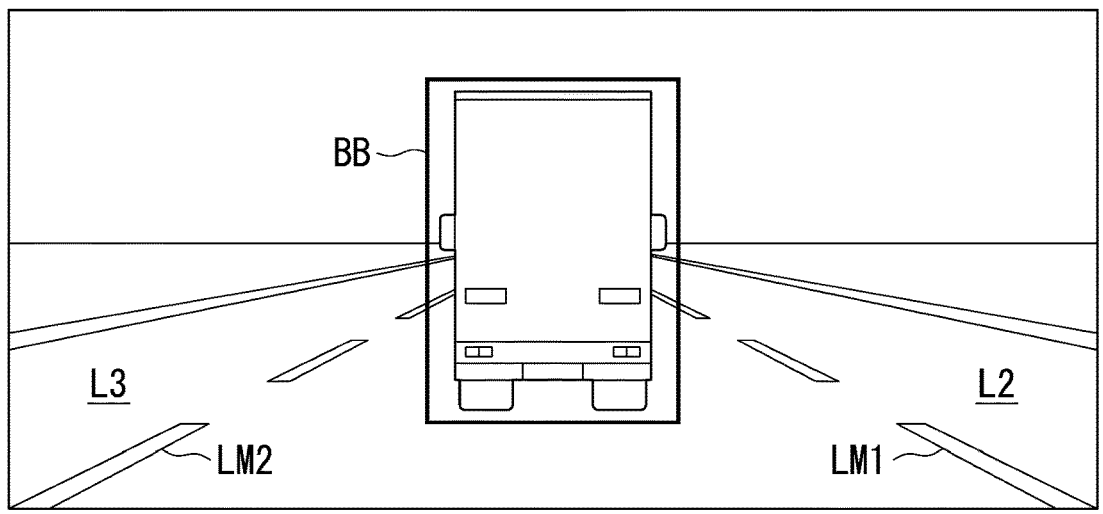
FIG. 5 is a diagram showing an example of an image from which a bounding box has been extracted.

FIGS. 4 and 5 are diagrams showing an example of the image from which the bounding box BB has been extracted. In FIGS. 4 and 5, L1 indicates a host lane in which the host vehicle M travels, L2 indicates an adjacent lane that is adjacent to the right side of the host lane L1, and L3 indicates an adjacent lane that is adjacent to the left side of the host lane L1. LM1 indicates a lane demarcation line that partitions between the host lane L1 and the right adjacent lane L2, and LM2 indicates a lane demarcation line that partitions between the host lane L1 and the left adjacent lane L3. The camera 102 images a region ahead of the host vehicle M. Therefore, for example, when there is a preceding vehicle in front of the host vehicle M in the host lane L1, the extractor 132 extracts a region at a rear (rear surface) of the preceding vehicle as the bounding box BB from the image. Hereinafter, a scene shown in FIG. 4 is referred to as scene A, and a scene shown in FIG. 5 in which a preceding vehicle is closer to the host vehicle M than in the scene shown in FIG. 4 is referred to as scene B.

When the extractor 132 extracts the bounding box BB from each of the plurality of images, the predictor 134 compares region areas of the bounding boxes BB of the respective images and predicts the occurrence of a traffic jam on the road on which there is the host vehicle M on the basis of change in the region area of the bounding box BB. In other words, the predictor 134 performs analysis to determine how a region area of the region at the rear of the other vehicle present in front of the host vehicle M changes on the basis of the plurality of images that are series data continuous in time or distance to predict that a traffic jam will occur on the road on which there is the host vehicle M.

For example, when the predictor 134 predicts the occurrence of a traffic jam, the output controller 136 causes an image indicating the occurrence of a traffic jam to be displayed on the display 106.

The communication controller 138 transmits data indicating a prediction result of the predictor 134 to the server device 200 via the communicator 104.

The learner 140 learns the inference model MDL on the basis of teacher data prepared in advance. The teacher data is a data set in which the coordinates of the bounding box BB on the image are associated as a teacher label (also referred to as a target) with an image obtained by imaging a region ahead of the host vehicle M in a situation in which there are other vehicles such as a preceding vehicle in front of the host vehicle M.

For example, the learner 140 inputs an image of the teacher data to the inference model MDL, and learns the inference model MDL so that the coordinates of the bounding box BB output by the inference model MDL to which the image has been input approaches coordinates of a correct bounding box BB associated as the teacher label.

For example, when the inference model MDL is a neural network, the learner 140 learns parameters of the inference model MDL using a stochastic gradient descent method such as stochastic gradient descent (SGD), momentum SGD, AdaGrad, RMSprop, AdaDelta, or adaptive moment estimation (Adam), so that a difference between the coordinates of the bounding box BB output by the inference model MDL and the coordinates of the bounding box BB of the teacher label is reduced.

A case in which the controller 130 of the prediction device 100 includes the learner 140 has been described above, but the present invention is not limited thereto and the controller 130 may not include the learner 140. For example, a device other than the prediction device 100 (for example, the server device connected to the prediction device 100 via the network NW) may learn the inference model MDL. In this case, the prediction device 100, for example, downloads the inference model data 112 in which the inference model MDL learned by the other device has been defined, from the other device, and stores the inference model data 112 in the storage 110.

[Processing Flow of Prediction Device]

Figure 6:
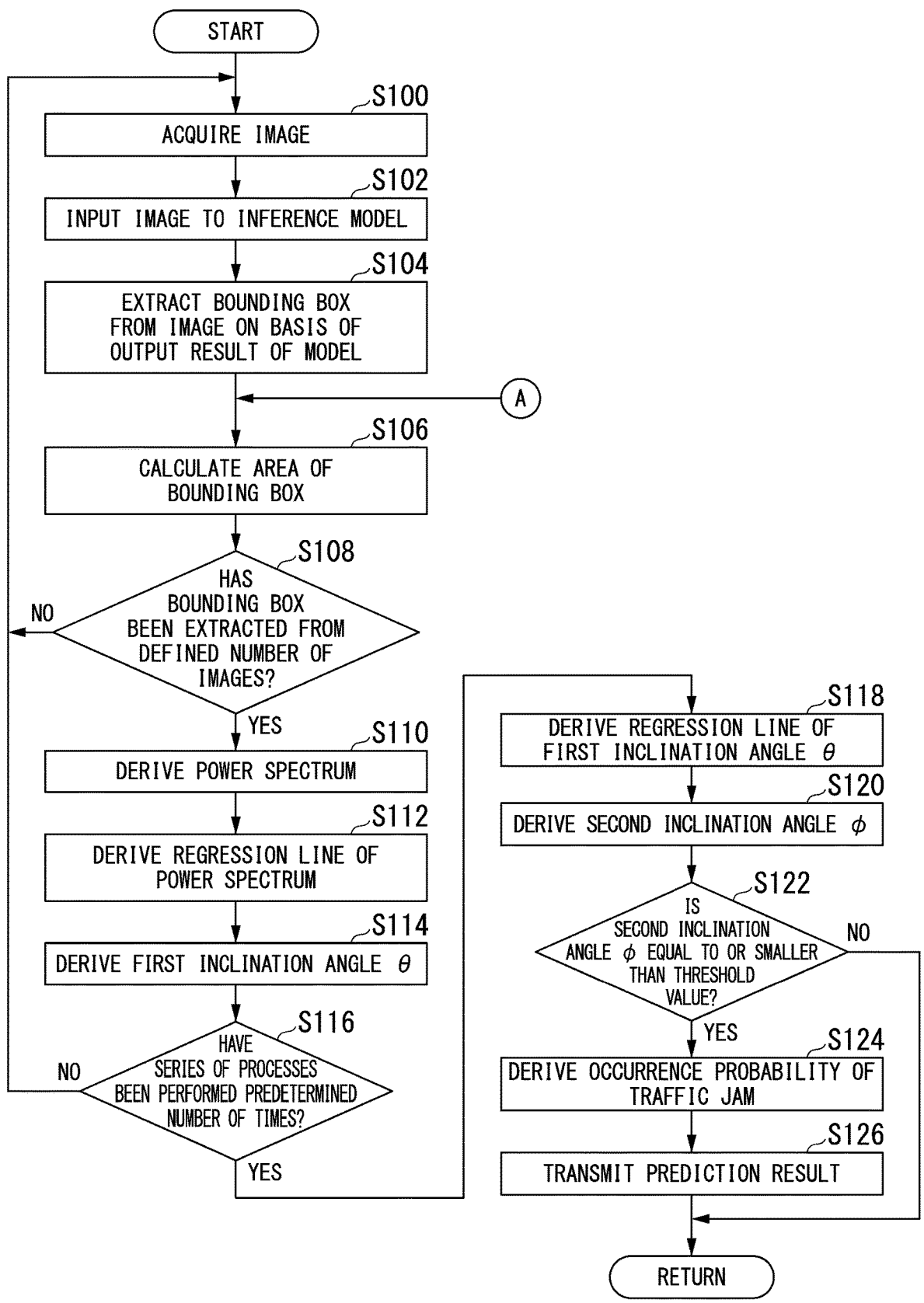
FIG. 6 is a flowchart showing a flow of a series of processes of the prediction device according to the first embodiment.

Hereinafter, a flow of a series of processes of the prediction device 100 according to the first embodiment will be described using a flowchart. FIG. 6 is a flowchart showing the flow of the series of processes of the prediction device 100 according to the first embodiment. The process of this flowchart may be repeatedly performed at a predetermined cycle.

First, the extractor 132 acquires the image from the camera (step S100) and inputs the acquired image to the inference model MDL (step S102).

Then, the extractor 132 extracts the bounding box BB from the image on the basis of an output result of the inference model MDL to which the image has been input, that is, the coordinates of the bounding box BB (step S104).

Then, the predictor 134 calculates an area of the bounding box BB extracted by the extractor 132 (step S106). For example, the predictor 134 counts the number of pixels included in an image region extracted as the bounding box BB, and multiplies the counted number of pixels by a size of each pixel to calculate the area of the bounding box BB. The predictor 134 may calculate a length of a diagonal line or a length of one side of the bounding box BB instead of or in addition to the area of the bounding box BB.

Then, the predictor 134 determines whether or not the bounding box BB has been extracted from a defined number of images (step S108). The specified number may be, for example, the number of times imaging is repeated before a predetermined period of time (several seconds to tens of seconds) elapses, or may be the number of times imaging is repeated before the host vehicle M travels a predetermined distance.

The predictor 134 returns to the process of S100 when the bounding box BB has not yet been extracted from the defined number of images. Then, the extractor 132 repeats the extraction of the bounding box BB from each image repeatedly captured by the camera 10 until the bounding box BB is extracted from the defined number of images.

On the other hand, when the bounding box BB has been extracted from the defined number of images, the predictor 134 performs spectrum analysis (frequency analysis) on the change in the area of the bounding box BB between the images to derive a power spectrum (step S110). The power spectrum indicates how the area of the bounding box BB extracted from each of a plurality of images in a certain series, which are temporally or spatially continuous, is distributed according to the frequency.

Figure 7:
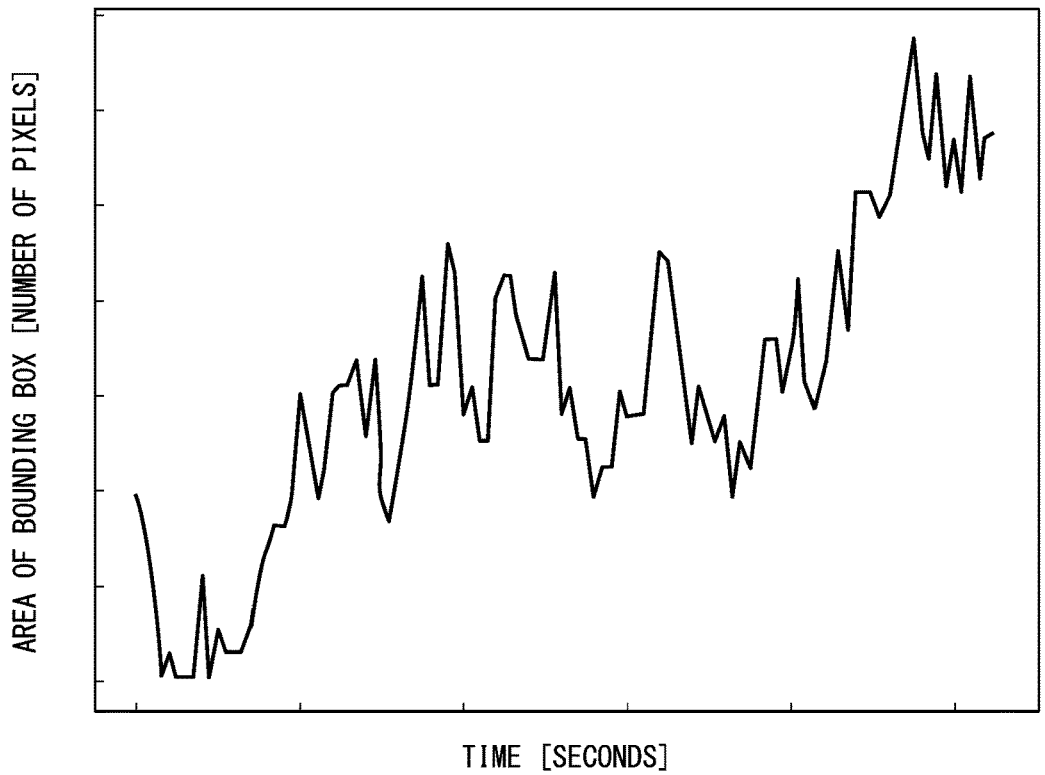
FIG. 7 is a diagram showing an example of a change in an area of the bounding box.

FIG. 7 is a diagram showing an example of the change in the area of the bounding box BB. In the shown example, a change in the area of the bounding box BB with respect to time is shown. For example, the predictor 134 regards the change in the area of the bounding box BB with respect to time as one signal, and calculates an autocorrelation of the signal. The predictor 134 performs a Fourier transform on the calculated autocorrelation to derive a power spectrum. When the predictor 134 has calculated the length of the diagonal line or the length of the one side of the bounding box BB instead of or in addition to the area of the bounding box BB, the predictor 134 performs spectrum analysis on a change in the length between the images to derive a power spectrum.

The description will now return to the flowchart of FIG. 6. Next, the predictor 134 derives a regression line of the power spectrum in a certain frequency band (step S112).

For example, it is known that there is a phenomenon called a butterfly effect (a chaos phenomenon) in a traffic flow showing chaotic behavior, and it is difficult to predict how the traffic flow will change, over a long term. It is also known that, in a traffic flow in chaotic motion due to the butterfly effect, a power spectrum at a low frequency has a greater influence on the occurrence of a traffic jam than one at a high frequency.

Accordingly, the predictor 134 applies a least square method or the like to a power spectrum in a frequency band lower than a certain reference frequency (hereinafter referred to as a low frequency band) and estimates parameters such as a weight coefficient α and a bias component b, thereby deriving a regression line such as y=αx+b.

The predictor 134 then derives an inclination angle of the derived regression line (hereinafter referred to as a first inclination angle θ) (step S114).

Figure 8:
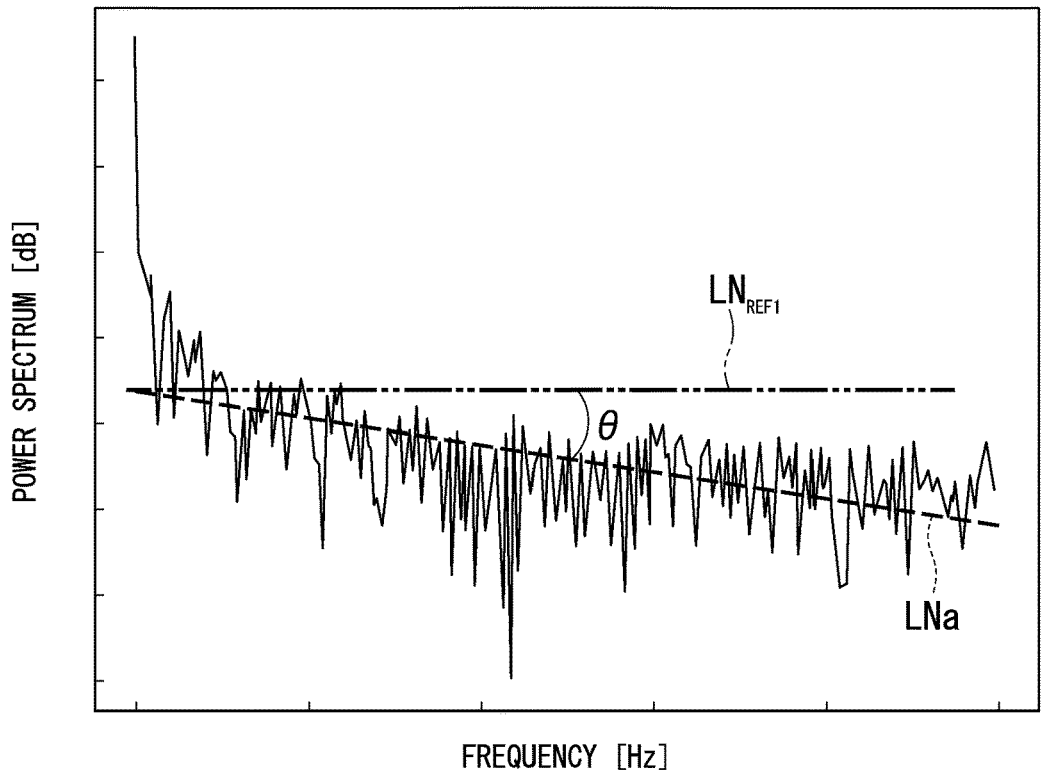
FIG. 8 is a diagram showing an example of an inclination angle.

FIG. 8 is a diagram showing an example of the first inclination angle θ. A horizontal axis in FIG. 8 indicates a frequency (for example, in [Hz]), and a vertical axis indicates the power spectrum (for example, in [dB]). LNa indicates a regression curve. As in the shown example, the first inclination angle θ is an angle between an approximate straight line in which a strength (for example, a density, a voltage, or power) of the power spectrum is constant regardless of a frequency, as in white noise, that is, a straight line $LN_{REF1}$ parallel to the frequency axis, which is the horizontal axis, and a regression line LNa. For example, in the case of a straight line in which the power spectrum attenuates as the regression line LNa becomes higher in frequency than the straight line $LN_{REF1}$ parallel to the frequency axis, the first inclination angle θ becomes a negative angle, and in the case of a straight line in which the power spectrum is amplified as the regression line LNa becomes higher in frequency than the straight line $LN_{REF1}$ parallel to the frequency axis, the first inclination angle θ becomes a positive angle. Therefore, the first inclination angle θ indicates a degree of attenuation of the strength of the power spectrum according to the frequency.

Generally, as the power spectrum becomes higher from a high frequency to a low frequency like pink noise, a change in a delay of a dynamic time response of acceleration and deceleration increases, and a speed variation increases. Accordingly, it becomes difficult for the host vehicle M to be caused to travel with a preference for energy efficiency such as fuel efficiency, it becomes easy for a traffic jam to occur, and energy efficiency tends to decrease.

For example, when an inclination (hereinafter referred to as a second inclination angle ϕ) of the regression line of the first inclination angle θ in the low frequency band is small, it is easy for shock waves that the host vehicle M receives from the preceding vehicle to be small. The shock waves mean waves generated when acceleration and deceleration operations (back and forth movement) are propagated to a following vehicle as a kind of vibration or fluctuation by a vehicle repeating the acceleration and deceleration operations. When the shock waves that the host vehicle M receives from preceding vehicle are small, a delay of a reaction of the host vehicle M to the preceding vehicle decreases, it becomes difficult to have an influence on other vehicles such as the following vehicle, and it becomes easy for the host vehicle M to be caused to travel in synchronization with the other vehicles. As a result, it becomes easy for the likelihood of a traffic jam occurring to decrease.

On the other hand, when the second inclination angle $\phi$, which is the inclination of the regression line of the first inclination angle $\theta$ in the low frequency band, is great, it is easy for the shock waves that the host vehicle M receives from the preceding vehicle to be great. Therefore, the delay of the reaction of the host vehicle M to the preceding vehicle increases, it becomes easy to have an influence on other vehicles such as the following vehicle, and it becomes difficult for the host vehicle M to be caused to travel in synchronization with the other vehicles. As a result, it becomes easy for the likelihood of a traffic jam occurring to increase.

The description will now return to the flowchart of FIG. 6. The predictor 134 then determines whether or not a series of processes of S110 to S114, that is, a process of deriving the first inclination angle $\theta$, has been performed a predetermined number of times (step S116).

The predictor 134 returns to the process of S100 when the process of deriving the first inclination angle $\theta$ has not been performed the predetermined number of times.

On the other hand, when the predictor 134 has performed the process of deriving the first inclination angle $\theta$ a predetermined number of times, the predictor 134 derives an average regression line of the first inclination angle $\theta$ (step S118), and derives a second inclination angle $\phi$, which is the inclination of the regression line (step S120).

Figure 9:
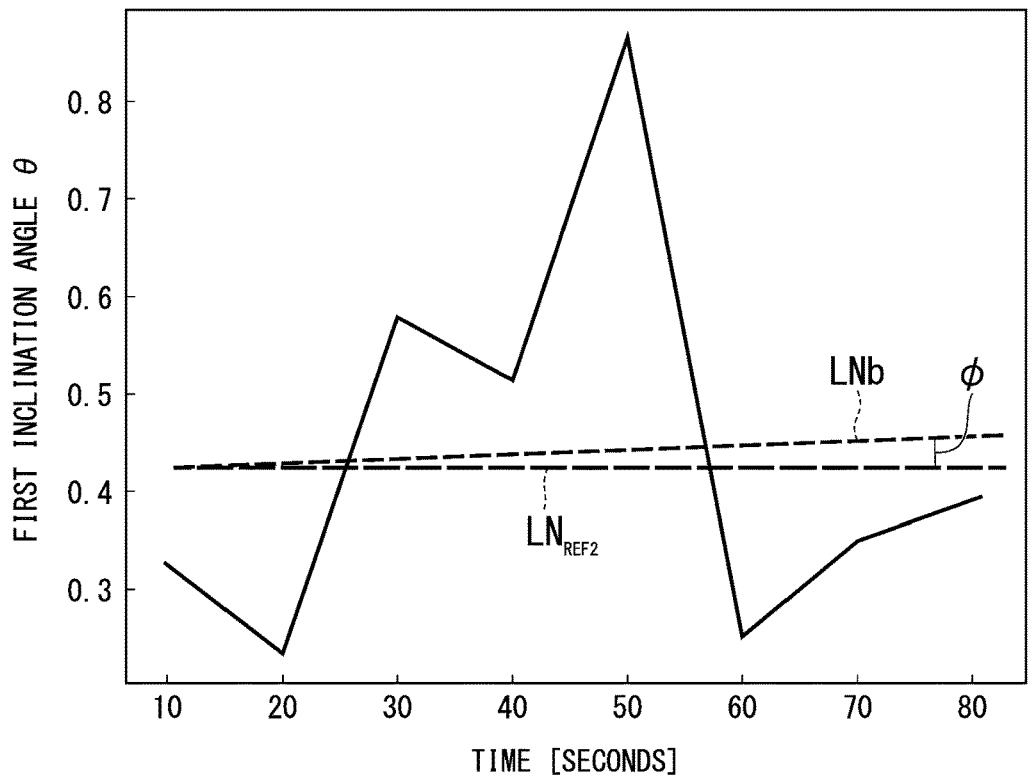
FIG. 9 is a diagram showing an example of an inclination angle in scene A.
Figure 10:
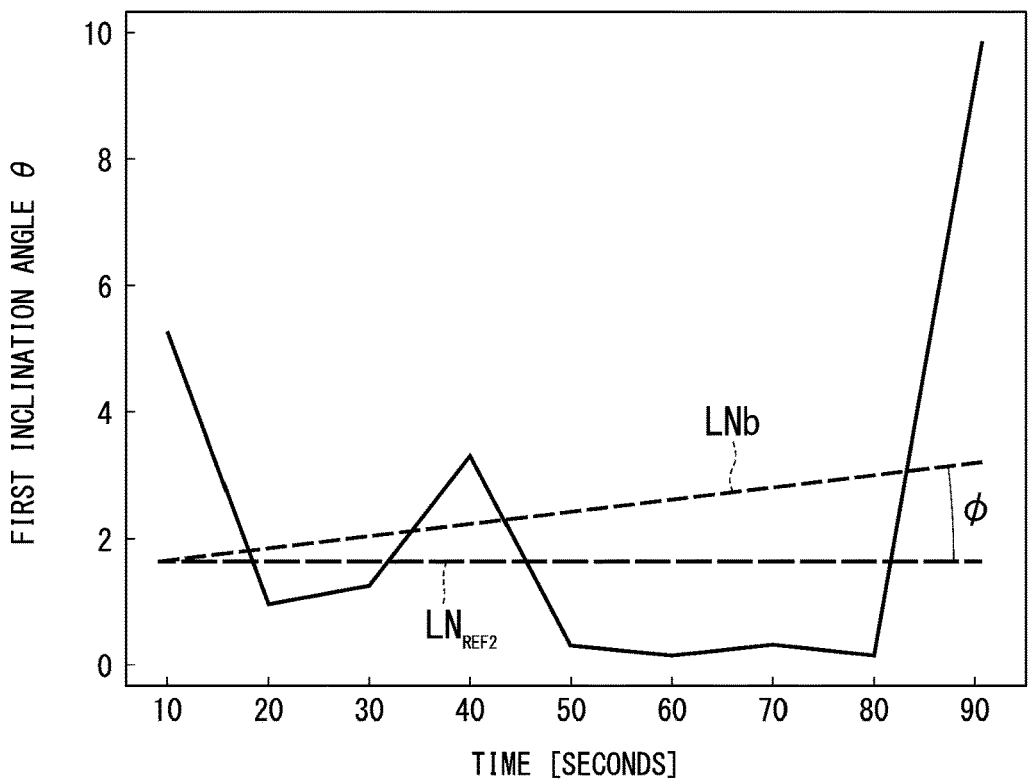
FIG. 10 is a diagram showing an example of an inclination angle in scene B.

FIG. 9 is a diagram showing an example of the first inclination angle $\theta$ in scene A. FIG. 10 is a diagram showing an example of the first inclination angle $\theta$ in scene B. A vertical axis in each of FIGS. 9 and 10 indicates the first inclination angle $\theta$, and a horizontal axis indicates time (in [seconds]) as an example. In any of FIGS. 9 and 10, it is shown that the first inclination angle $\theta$ is derived repeatedly at a cycle of 10 seconds. As in the shown example, the second inclination angle $\phi$ is an angle between an approximate straight line in which a strength of the power spectrum is constant regardless of a frequency, that is, a straight line $LN_{REF2}$ parallel to the frequency axis, which is the horizontal axis, and a regression line LNb of the first inclination angle $\theta$.

It is shown that since an average regression line LNb of the first inclination angle $\theta$ in FIG. 9 is gentler in an inclination than an average regression line LNb of the first inclination angle $\theta$ in FIG. 10, the second inclination angle $\phi$ is smaller in scene A than in scene B. That is, it is shown that a change in relative acceleration between the host vehicle M and the preceding vehicle is smaller and smoother driving is being performed in scene A than in scene B.

The description will now return to the flowchart of FIG. 6. The predictor 134 then determines whether or not the second inclination angle $\phi$ is equal to or smaller than a threshold value $\phi_{TH}$ (step S122). The threshold value $\phi_{TH}$ is an angle serving as a boundary as to whether or not a traffic jam has occurred, and is set to, for example, an inclination angle (=about −45 degrees) of a regression curve with 1/f fluctuation (1/f noise) in which the power spectrum attenuates in inverse proportion to the frequency.

For example, when the second inclination angle $\phi$ is an angle equal to or smaller than the threshold value $\phi_{TH}$ such as −60 degrees, the attenuation of the strength of the power spectrum according to the frequency is an attenuation greater than 1/f fluctuation. Therefore, a determination can be made that the likelihood of a traffic jam occurring is high.

On the other hand, for example, when the second inclination angle $\phi$ is an angle exceeding the threshold value $\phi_{TH}$ such as −10 degrees, the attenuation of the strength of the power spectrum according to the frequency is an attenuation smaller than 1/f fluctuation. Therefore, a determination can be made that the likelihood of a traffic jam occurring is low.

Therefore, the predictor 134 derives the occurrence probability of a traffic jam when the likelihood of the occurrence of a traffic jam is high, that is, when the second inclination angle $\phi$ is equal to or smaller than the threshold value $\phi_{TH}$ (step S124). For example, the predictor 134 may derive the occurrence probability having a greater value as the second inclination angle $\phi$ decreases, and derive the occurrence probability having a smaller value as the second inclination angle $\phi$ increases.

The predictor 134 may further determine whether or not the second inclination angle $\phi$ is positive and determine whether or not to derive the occurrence probability of a traffic jam according to a result of the determination, in addition to determining whether or not the second inclination angle $\phi$ is equal to or smaller than the threshold value $\phi_{TH}$.

For example, when the second inclination angle $\phi$ is equal to or smaller than the threshold value $\phi_{TH}$ and the second inclination angle $\phi$ is positive, the predictor 134 can determine that there is a sign that a traffic jam will occur and the likelihood of a traffic jam occurring increases as time passes or as a traveling distance increases.

When the second inclination angle $\phi$ exceeds the threshold value $\phi_{TH}$ and the second inclination angle $\phi$ is positive, the predictor 134 can determine that the likelihood of a traffic jam occurring increases as time passes or as a traveling distance increases, but it is not a sign that traffic jam will occur.

When the second inclination angle $\phi$ is equal to or smaller than the threshold value $\phi_{TH}$ and the second inclination angle $\phi$ is negative, the predictor 134 can determine that there is a temporary sign that a traffic jam will occur, but the likelihood of a traffic jam occurring decreases as time passes or as a traveling distance increases.

When the second inclination angle $\phi$ exceeds the threshold value $\phi_{TH}$ and the second inclination angle $\phi$ is negative, the predictor 134 can determine that there is no sign that a traffic jam will occur and the likelihood of a traffic jam occurring decreases as time passes or as a traveling distance increases.

Therefore, the predictor 134 may derive the occurrence probability having a greater value as the second inclination angle $\phi$ is smaller in a range of the threshold value $\phi_{TH}$ or less and the second inclination angle $\phi$, which is the inclination of the regression line LNb of the first inclination angle $\theta$, positively increases, and derive the occurrence probability having a smaller value as the second inclination angle $\phi$ is greater in a range of the threshold value $\phi_{TH}$ or less and the second inclination angle $\phi$ negatively increases.

More specifically, when the second inclination angle $\phi$ is equal to or smaller than the threshold value $\phi_{TH}$, the predictor 134 may determine the occurrence probability to be 1 in a case in which the second inclination angle $\phi$ is positive ($\phi > \phi_{TH} > 0$), and determine the occurrence probability to be 0 in a case in which the second inclination angle $\phi$ is negative ($0 < \phi < \phi_{TH}$).

After the predictor 134 derives the occurrence probability, the predictor 134 predicts that a traffic jam will occur in the road on which there is the host vehicle M according to the derived occurrence probability. That is, the predictor 134 detects a sign of a traffic jam according to the occurrence probability.

For example, the predictor 134 may predict that a traffic jam will occur when the occurrence probability is equal to or greater than the threshold value, that is, when there is a sign of a traffic jam, and predict that no traffic jam will occur when the occurrence probability is smaller than the threshold value, that is, when there is no sign of a traffic jam.

The communication controller 138 then controls the communicator 104 so that an indication indicating the occurrence or non-occurrence of a traffic jam predicted by the predictor 134 is transmitted to the server device 200 as a traffic jam prediction result (step S126). Position information of the host vehicle M measured using the GNSS or the like may be included in the traffic jam prediction result. Thereby, the process of this flowchart ends.

[Configuration of Server Device]

Figure 11:
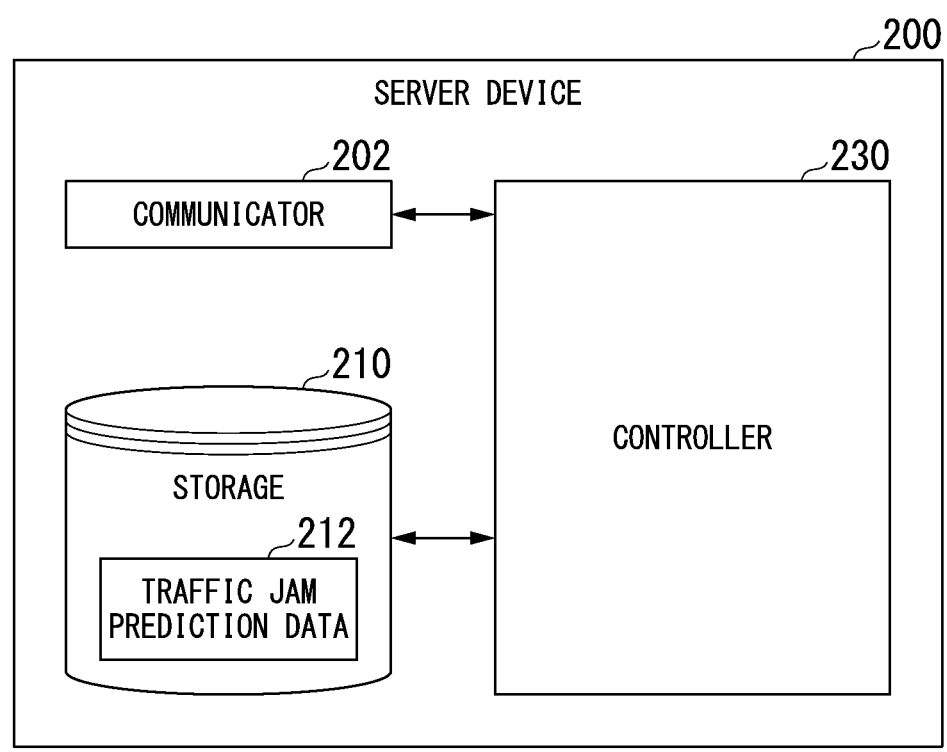
FIG. 11 is a diagram showing an example of a configuration of a server device according to the first embodiment.

FIG. 11 is a diagram showing an example of a configuration of the server device 200 according to the first embodiment. The server device 200 according to the first embodiment includes, for example, a communicator 202, a storage 210, and a controller 230.

The communicator 202 includes, for example, a communication interface such as an NIC. The communicator 202 communicates with, for example, the prediction device 100 mounted in each vehicle M via the network NW.

The storage 210 is realized by an HDD, a flash memory, an EEPROM, a ROM, a RAM, or the like. Programs that are referred to by a processor, and traffic jam prediction data 212, for example, are stored in the storage 210.

The traffic jam prediction data 212 is data in which occurrence or non-occurrence of a traffic jam is associated with identification information for identifying each vehicle. For example, when a prediction result transmitted from a certain vehicle A is a prediction result indicating that a traffic jam will occur, information indicating that a traffic jam will occur is associated with identification information of the vehicle A that has transmitted the prediction result to the server device 200, on the traffic jam prediction data 212.

When the prediction result is received from the prediction device 100 by the communicator 202, the controller 230 associates information indicating that a traffic jam will occur with the identification information of the vehicle M in which the prediction device 100 has been mounted, to update the traffic jam prediction data 212.

Further, the controller 230 performs control to curb the occurrence of a traffic jam by referring to the traffic jam prediction data 212 at a predetermined cycle. For example, the controller 230 controls the communicator 202 so that information for instructing a vehicle traveling around a point at which there are a plurality of vehicles M that have predicted that a traffic jam will occur (hereinafter referred to as a traffic jam occurrence prediction point) to stop by a service area or a parking area is transmitted to the vehicle. The controller 230 may control the communicator 202 so that information for instructing a toll booth of a rampway for entrance to a route leading to the traffic jam occurrence prediction point to close the rampway is transmitted to the toll booth. The controller 230 may remotely control vehicles traveling around the traffic jam occurrence prediction point using the communicator 202, thereby limiting speeds of the vehicles or curbing lane changes.

According to the first embodiment described above, the prediction device includes the camera 102 that repeatedly images the region ahead of the host vehicle M, the extractor 132 that extracts the bounding box BB from each of the plurality of images repeatedly captured by the camera 102, and the predictor 134 that predicts that a traffic jam will occur on the road on which there is the host vehicle M on the basis of the change in the bounding box BB extracted from each of the plurality of images by the extractor 132 between the images. Therefore, it is possible to accurately predict that a traffic jam will occur. That is, it is possible to accurately detect a sign of a traffic jam. As a result, it is possible to appropriately control a traffic volume, for example, for the purpose of alleviating the traffic jam, and therefore, it is possible to prevent the traffic jam in advance or shorten a traffic jam time.

Second Embodiment

Hereinafter, a second embodiment will be described. In the first embodiment described above, a case in which it is predicted that a traffic jam will occur in a situation in which the preceding vehicle is present on the host lane has been described. On the other hand, the second embodiment is different from the first embodiment in that it is predicted that a traffic jam will occur when there is another vehicle in an adjacent lane in a situation in which a preceding vehicle is present in a lane. That is, the second embodiment is different from the first embodiment described above in that there are a plurality of other vehicles in front of the host vehicle M. Hereinafter, differences from the first embodiment will be mainly described, and description of points common to the first embodiment will be omitted. In the description of the second embodiment, the same portions as those in the first embodiment will be denoted by the same reference numerals and described.

Figure 12:
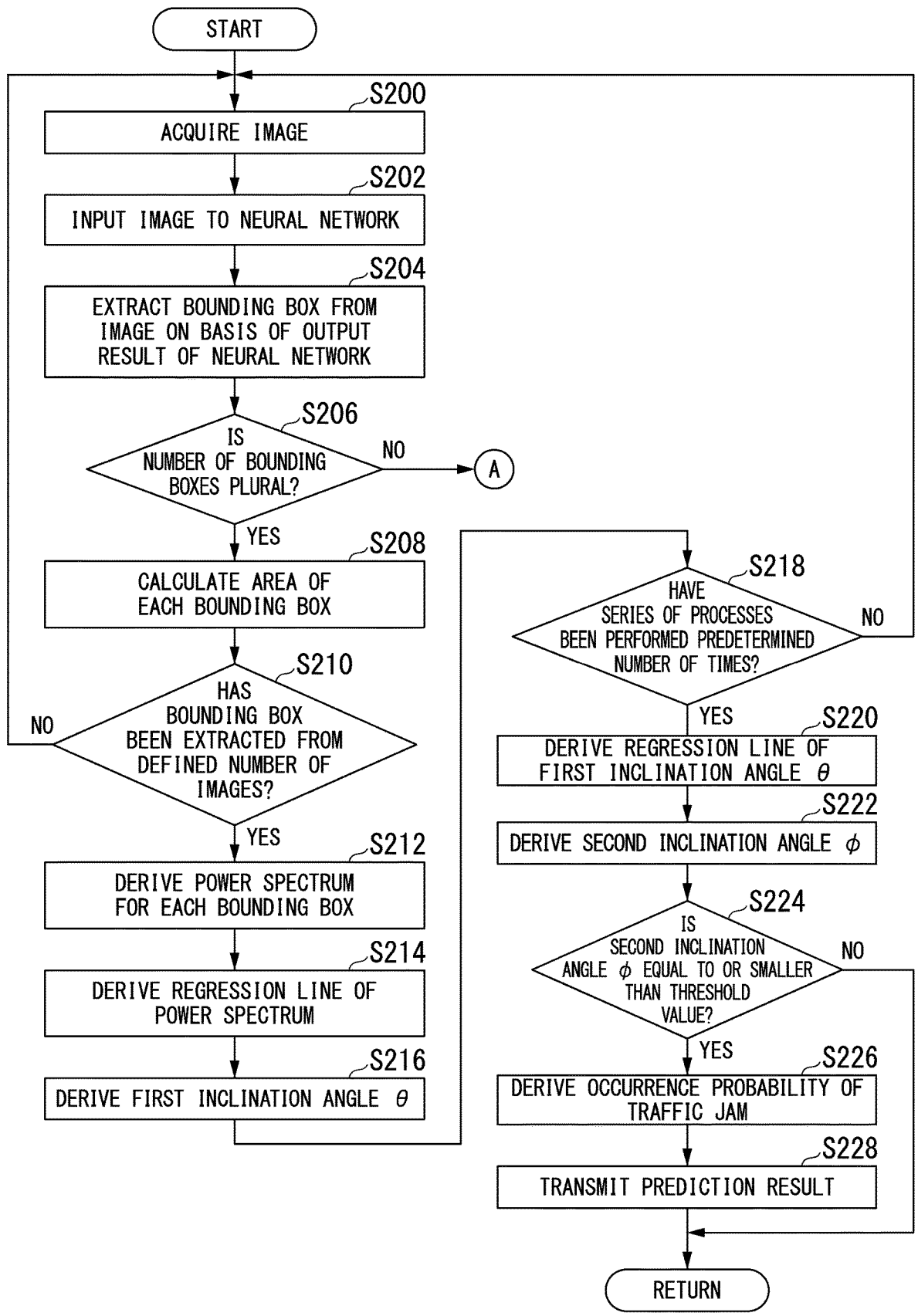
FIG. 12 is a flowchart showing a flow of a series of processes of the prediction device according to a second embodiment.

FIG. 12 is a flowchart showing a flow of a series of processes of the prediction device 100 according to the second embodiment. A process of this flowchart may be repeatedly performed at a predetermined cycle.

First, the extractor 132 acquires an image from the camera (step S200), and inputs the acquired image to the inference model MDL (step S202).

Then, the extractor 132 extracts the bounding box BB from the image on the basis of an output result of the inference model MDL to which the image has been input, that is, the coordinates of the bounding box BB (step S204).

Then, the predictor 134 determines whether or not the number of bounding boxes BB extracted by the extractor 132 is plural (step S206).

When the number of bounding boxes BB extracted by the extractor 132 is one, the predictor 134 proceeds to the process of S106 of the flowchart according to the first embodiment.

On the other hand, when the number of bounding boxes BB extracted by the extractor 132 is plural, the predictor 134 calculates an area of each of the plurality of bounding boxes BB (step S208). The predictor 134 may calculate a length of a diagonal line or a length of one side of the bounding box BB instead of or in addition to the area of the bounding box BB.

Figure 13:
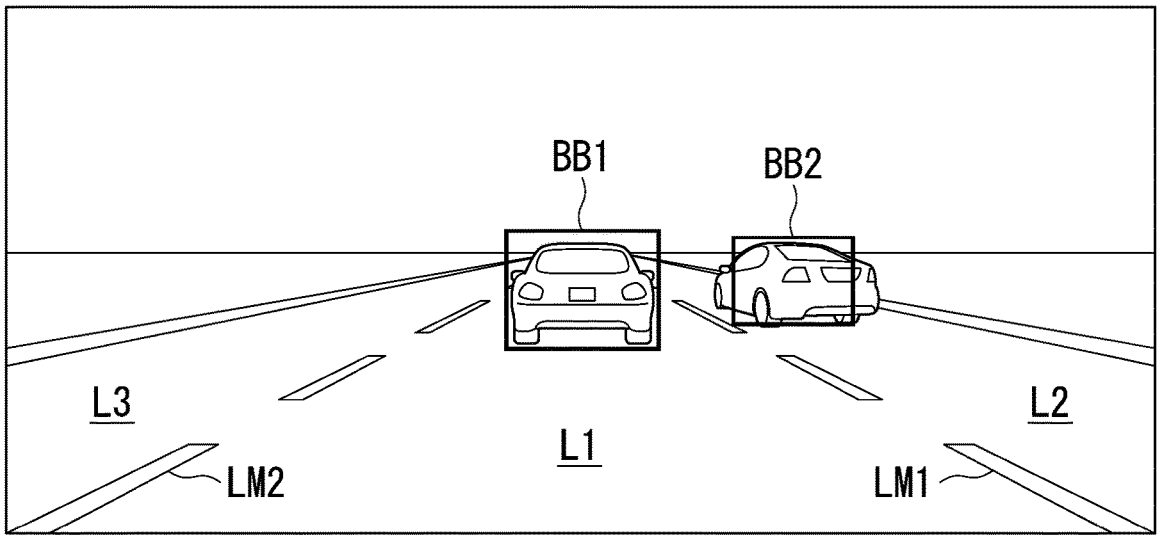
FIG. 13 is a diagram showing an example of an image from which a plurality of bounding boxes have been extracted.
Figure 14:
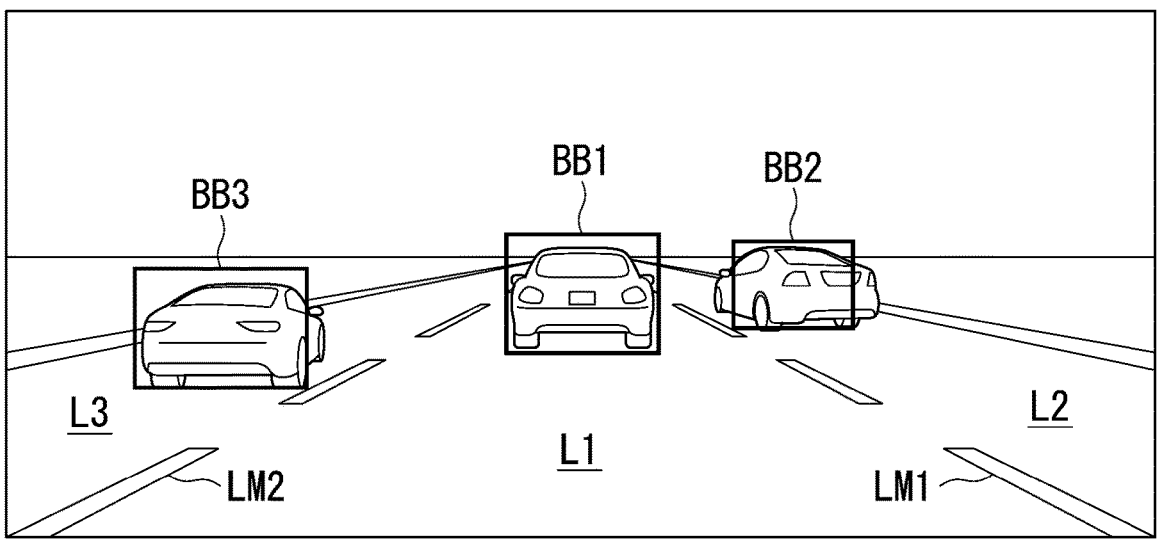
FIG. 14 is a diagram showing an example of an image from which a plurality of bounding boxes have been extracted.

FIGS. 13 and 14 are diagrams showing an example of an image from which a plurality of bounding boxes BB have been extracted. In an image of scene C shown in FIG. 13, a preceding vehicle is present in the host lane L1, and another vehicle is present in the adjacent lane L2 on the right side. In an image of scene D shown in FIG. 13, there is another vehicle in the left adjacent lane L3. In such a scene, the extractor 132 according to a third embodiment extracts a region at the rear of each vehicle as a bounding box BB from the image. For example, the extractor 132 extracts a region at the rear of the preceding vehicle present in the host lane L1 as a bounding box BB1 from the image of scene C, and extracts a region at the rear of the other vehicle present in the adjacent lane L2 as a bounding box BB2 from the image of scene C. The extractor 132 extracts a region at the rear of the preceding vehicle present in the host lane L1 as a bounding box BB1 from the image of scene D, extracts a region at the rear of the other vehicle present in the adjacent lane L2 as a bounding box BB2 from the image of scene D, and extracts a region at the rear of the other vehicle present in the adjacent lane L3 as a bounding box BB3 from the image of scene D. The predictor 134 then calculates an area of each bounding box BB.

Then, the predictor 134 determines whether or not the bounding box BB has been extracted from the defined number of images (step S210).

The predictor 134 returns to the process of S200 when the bounding box BB has not yet been extracted from the defined number of images. Then, the extractor 132 repeats the extraction of the bounding box BB from each image repeatedly captured by the camera 10 until the bounding box BB is extracted from the defined number of images.

On the other hand, when the bounding box BB is extracted from the defined number of images, the predictor 134 performs spectrum analysis on a change in the area between the respective images of the plurality of bounding boxes BB, a change in the length of the diagonal line between the images, a change in the length of the one side between the images, or the like, to derive a power spectrum corresponding to each bounding box BB on a one-to-one basis (step S212).

Figure 15:
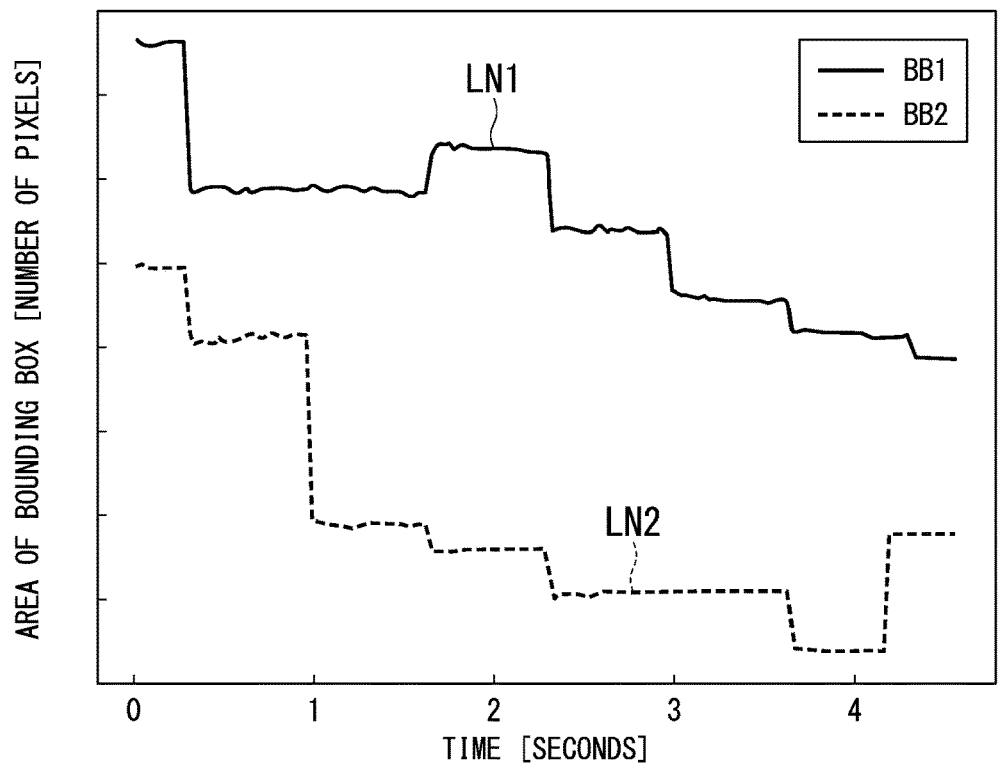
FIG. 15 is a diagram showing an example of a change in an area of a bounding box in scene C.

FIG. 15 is a diagram showing an example of a change in the area of the bounding box BB in scene C. In FIG. 15, LN1 indicates a change in an area of the bounding box BB1 of the preceding vehicle present on the host lane L1 with respect to time, and LN2 indicates a change in an area of the bounding box BB2 of the other vehicle present on the adjacent lane L2 with respect to time.

For example, the predictor 134 according to the second embodiment regards the change in the area of each of the bounding box BB1 and the bounding box BB2 with respect to time as one signal, and calculates an autocorrelation of the signal. The predictor 134 performs Fourier transform on the calculated autocorrelation to derive a power spectrum corresponding to each of the plurality of bounding boxes BB. When the predictor 134 has calculated a length of a diagonal line or a length of one side of the bounding box BB instead of or in addition to the area of the bounding box BB, the predictor 134 may perform spectrum analysis on a change in the length between the images to derive a power spectrum.

The host lane is an example of a "first lane", and the adjacent lane is an example of a "second lane". The preceding vehicle on the host lane is an example of a "first other vehicle", and the other vehicle on the adjacent lane is an example of a "second other vehicle". The bounding box BB1 is an example of a "first region", and the bounding box BB2 or the bounding box BB3 is an example of a "second region". The power spectrum corresponding to the bounding box BB1 is an example of a "first power spectrum", and the power spectrum corresponding to the bounding box BB2 or the bounding box BB3 is an example of a "second power spectrum".

The predictor 134 then derives a regression line of the power spectrum corresponding to each bounding box BB in the low frequency band (step S214).

The predictor 134 then derives the first inclination angle θ of the regression line derived for each power spectrum (step S216). For example, the predictor 134 derives the inclination of the regression line of the power spectrum corresponding to the bounding box BB1 as a first inclination angle θ1, and derives the inclination of the regression line of the power spectrum corresponding to the bounding box BB2 as a first inclination angle θ2.

The predictor 134 then determines whether or not a series of processes of S212 to S216, that is, a process of deriving the first inclination angle θ has been performed a predetermined number of times (step S218).

The predictor 134 returns to the process of S200 when the process of deriving the first inclination angle θ has not been performed a predetermined number of times.

On the other hand, when the predictor 134 has performed the process of deriving the first inclination angle θ a predetermined number of times, the predictor 134 derives an average regression line of the first inclination angle θ for each power spectrum and derives the second inclination angle φ, which is the inclination of the regression line (step S220).

Figure 16:
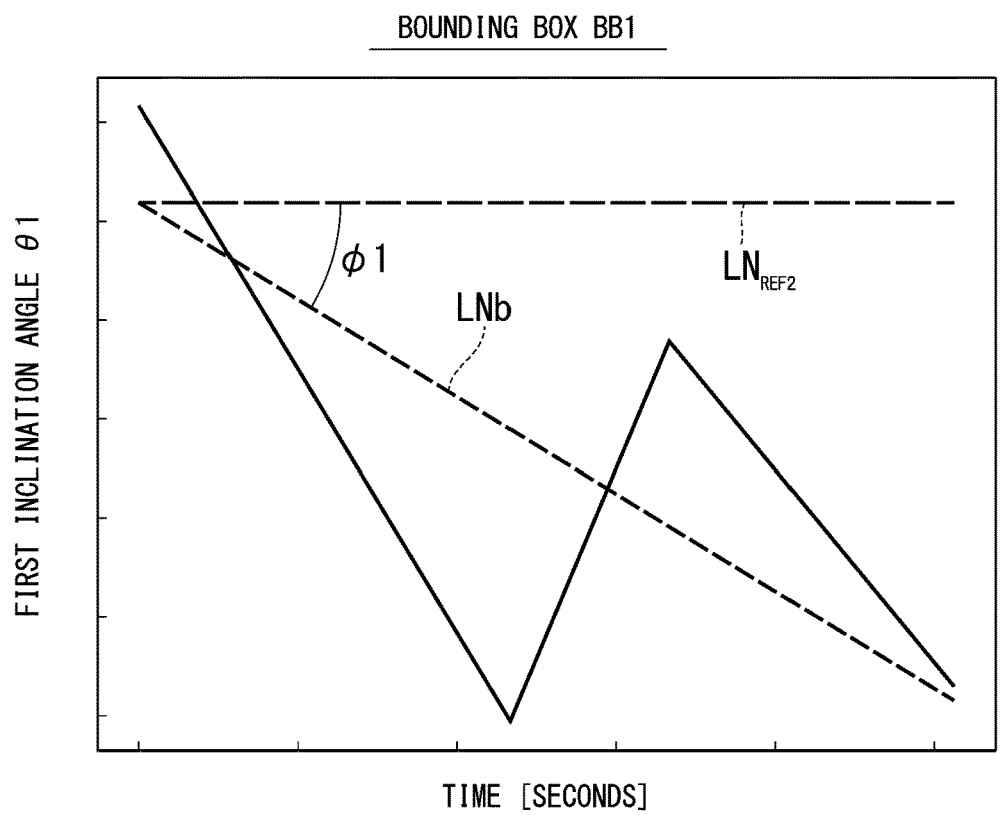
FIG. 16 is a diagram showing an example of an inclination angle in scene C.
Figure 17:
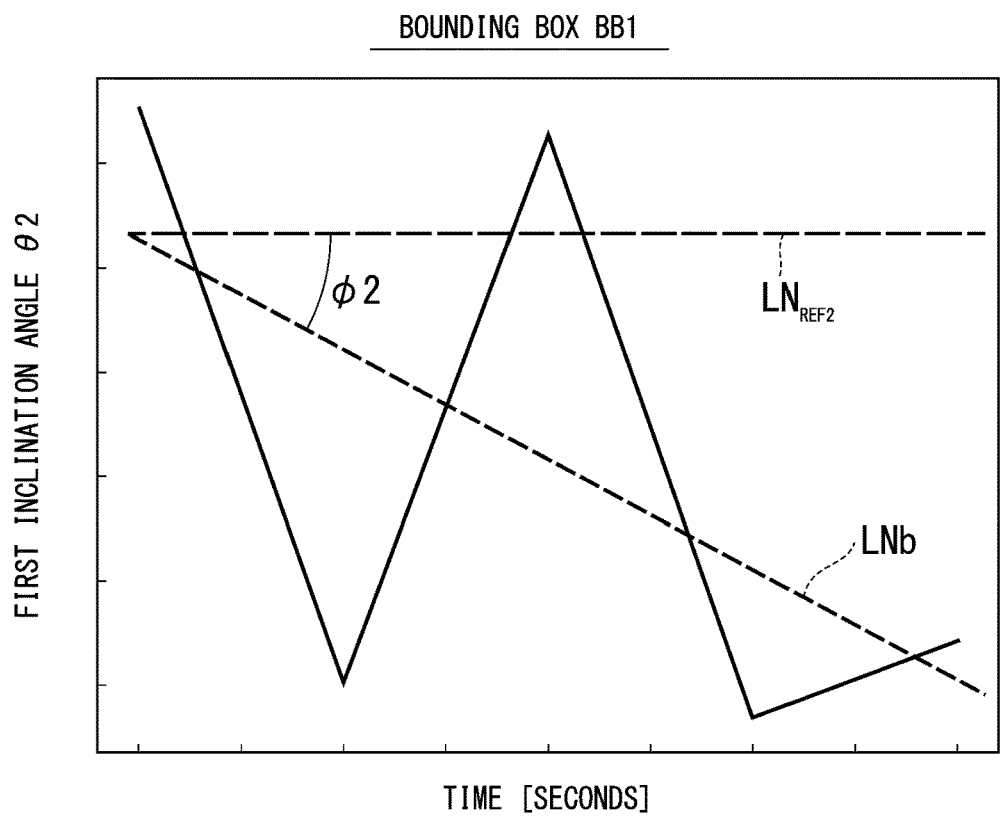
FIG. 17 is a diagram showing an example of an inclination angle in scene C.

FIGS. 16 and 17 are diagrams showing an example of the first inclination angle θ in scene C. FIG. 16 shows the first inclination angle θ1 that is the inclination of the regression line of the power spectrum corresponding to the bounding box BB1, and FIG. 17 shows the first inclination angle θ2 that is the inclination of the regression line of the power spectrum corresponding to the bounding box BB2.

The predictor 134 derives an angle between the straight line $LN_{REF2}$ parallel to the frequency axis, which is the horizontal axis, and the regression line LNb of the first inclination angle θ1 as a second inclination angle φ1 corresponding to the bounding box BB1, and derives an angle between the straight line $LN_{REF2}$ and the regression line LNb of the first inclination angle θ2 as a second inclination angle φ2 corresponding to the bounding box BB2

The predictor 134 then determines whether or not each of the second inclination angles φ corresponding to the respective bounding boxes BB is equal to or smaller than the threshold value $φ_{TH}$ (step S224).

When the predictor 134 has determined that all the second inclination angles φ exceed the threshold value $φ_{TH}$, the predictor 134 predicts that no traffic jam will occur and ends the process of this flowchart.

On the other hand, when the predictor 134 has determined that at least one of the second inclination angles φ is equal to or smaller than the threshold value $φ_{TH}$, the predictor 134 derives an occurrence probability of the traffic jam on the basis of the second inclination angle φ that is equal to or smaller than the threshold value $φ_{TH}$ (step S226).

For example, when the second inclination angle φ corresponding to the bounding box BB of the preceding vehicle present on the host lane is equal to or smaller than the threshold value $φ_{TH}$ and the second inclination angle φ corresponding to the bounding box BB of the preceding vehicle is positive, the predictor 134 derives the occurrence probability on the basis of the number of second inclination angles φ that are equal to or smaller than the threshold value $φ_{TH}$ and are a positive value among second inclination angles ϕ corresponding to respective bounding boxes BB of one or more other vehicles present on the adjacent lane.

In other words, when the chaos phenomenon also occurs in behaviors of other vehicles present on the adjacent lane in a situation in which the chaos phenomenon occurs in a behavior of the preceding vehicle present on the host lane, the predictor 134 derives the occurrence probability on the basis of the number of other vehicles showing the chaotic behavior on the adjacent lane.

For example, when the predictor 134 has determined that a chaotic behavior appears in two of the one or more other vehicles present on the adjacent lane, that is, when two other vehicles satisfying a condition that the second inclination angle ϕ is equal to or smaller than the threshold value $\phi_{TH}$ and is a positive value ($\phi > \phi_{TH} > 0$) are present on the adjacent lane, the predictor 134 derives, as the occurrence probability, a value obtained by multiplying the occurrence probability derived in a situation in which there is no other vehicle on the adjacent lane and there is a preceding vehicle only on the host lane (that is, the occurrence probability derived in the process of step S124) by a weighting factor such as a multiple of 2. Thus, by weighting the occurrence probability according to the number of other vehicles showing the chaotic behavior on the adjacent lane, it is possible to increase the occurrence probability of the traffic jam when other vehicles on the adjacent line show a behavior causing the chaos phenomenon even in a case in which the occurrence probability of the traffic jam due to only the behavior of the preceding vehicle is low.

After the predictor 134 derives the occurrence probability, the predictor 134 predicts that the traffic jam will occur when the derived occurrence probability is equal to or greater than the threshold value, that is, when there is a sign of the traffic jam, and predicts that no traffic jam will occur when the occurrence probability is smaller than the threshold value, that is, when there is no sign of the traffic jam.

The communication controller 138 then controls the communicator 104 so that an indication indicating the occurrence or non-occurrence of the traffic jam predicted by the predictor 134 is transmitted to the server device 200 as a traffic jam prediction result (step S228). Position information of the host vehicle M measured using the GNSS or the like may be included in the traffic jam prediction result. Thereby, the process of this flowchart ends.

According to the second embodiment described above, the extractor 132 extracts the bounding box BB of the preceding vehicle present on the host lane, and the bounding box BB of the other vehicle present on the at least one adjacent lane from each of the plurality of images repeatedly captured by the camera 102, and the predictor 134 predicts that the traffic jam will occur on the road on which there is the host vehicle M on the basis of the change in the bounding box BB of the preceding vehicle present on the host lane between the images and the change in the bounding box BB of the other vehicle present on the adjacent lane between the images. Therefore, it is possible to accurately predict that the traffic jam will occur, as in the first embodiment. Accordingly, for example, when another vehicle traveling in the adjacent lane changes the lane to the host lane, it is possible to consider that a preceding vehicle on the host lane is accelerated or decelerated under an influence of the other vehicle on the adjacent lane. As a result, it is possible to increase the occurrence probability of the traffic jam and to predict the occurrence of the traffic jam with higher accuracy when other vehicles on the adjacent line show a behavior causing the chaos phenomenon even in a case in which the occurrence probability of the traffic jam due to only the behavior of the preceding vehicle is low.

[Hardware Configuration]

Figure 18:
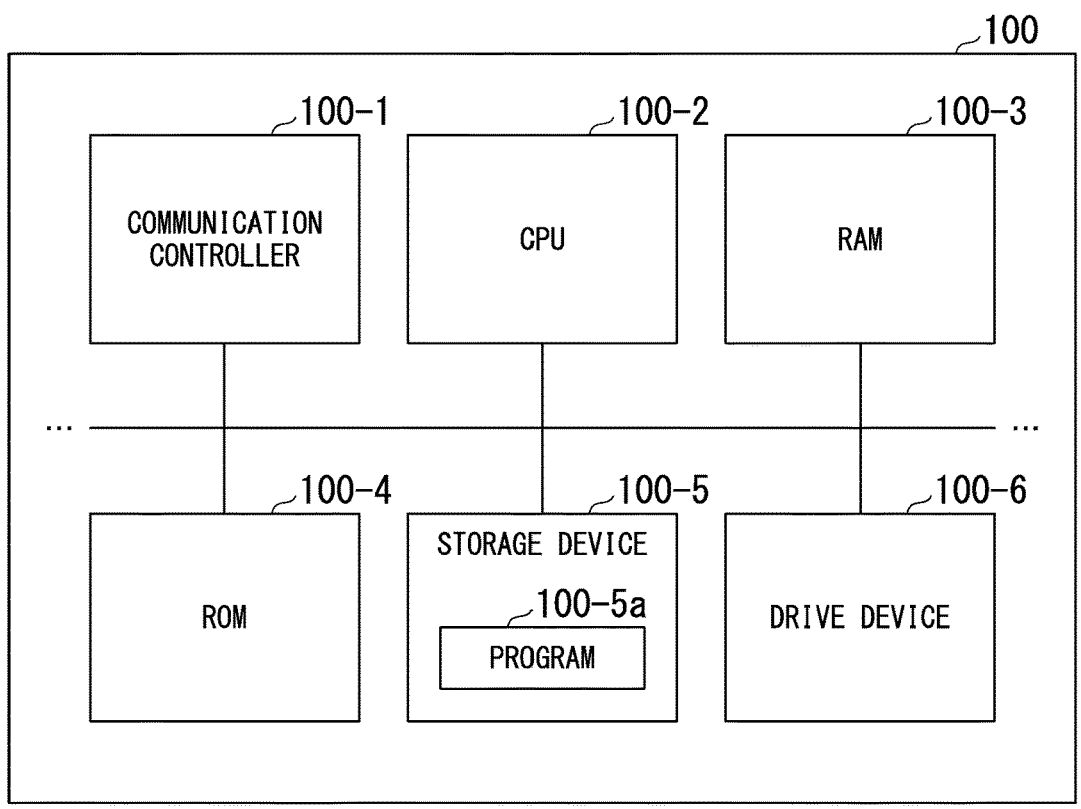
FIG. 18 is a diagram showing an example of a hardware configuration of the prediction device of the embodiment.

FIG. 18 is a diagram showing an example of a hardware configuration of the prediction device 100 according to the embodiment. As shown, the prediction device 100 includes, for example, a communication controller 100-1, a CPU 100-2, a RAM 100-3 that is used as a working memory, a ROM 100-4 that stores a boot program or the like, and a storage device 100-5 such as a flash memory or an HDD, and a drive device 100-6, which are connected to each other by an internal bus or a dedicated communication line. The communication controller 100-1 communicates with other devices. A program 100-5a that is executed by the CPU 100-2 is stored in in the storage device 100-5. This program is developed into the RAM 100-3 by a direct memory access (DMA) controller (not shown) or the like and executed by the CPU 100-2. Thereby, the controller 130 is realized.

The embodiment described above can be represented as follows.

A prediction device including:

a camera configured to repeatedly image a region ahead of a vehicle, a storage in which a program is stored, and a processor, wherein the prediction device is configured to extract a region including other vehicles from each of a plurality of images repeatedly captured by the camera, and predict that a traffic jam will occur in a road on which there is the vehicle on the basis of a change in the region extracted from each of the plurality of images between the images, by the processor executing the program.

Although the form for implementing the present invention has been described using the embodiments, the present invention is not limited to such embodiment at all, and various modification and substitution can be made without departing from the gist of the present invention.

What is claimed is:

1. A prediction device comprising:
    a camera configured to repeatedly image a region ahead of a host vehicle;
    an extractor configured to extract a region including other vehicles from each of a plurality of images repeatedly captured by the camera; and
    a predictor configured to predict that a traffic jam will occur in a road on which there is the host vehicle based on a change in size of the region extracted from each of the plurality of images by the extractor between the images,
    wherein the predictor
    performs spectrum analysis on the change in size of the region between the images to derive a power spectrum from the change in size of the region between the images,
    derives a regression line of the power spectrum,
    derives a first inclination angle, the first inclination angle being an inclination angle of the regression line of the power spectrum,
    derives a regression line of the first inclination angle,
    derives a second inclination angle, the second inclination angle being an inclination angle of the regression line of the first inclination angle, and
    predicts that a traffic jam will occur on the road based on the second inclination angle.

2. The prediction device according to claim 1, further comprising storage which stores inference model data, wherein, when an image repeatedly captured by the camera is input, the extractor inputs each said repeatedly captured image to a model learned using the inference model data to output a parameter regarding a region in which there is one said other vehicle in the input image, and extracts the region from each image repeatedly captured by the camera based on the parameter output by the model to which the image has been input.

3. The prediction device according to claim 1, wherein the predictor predicts that a traffic jam will occur on the road when the second inclination angle is an angle equal to or smaller than a threshold value, predicts that no traffic jam will occur on the road when the second inclination angle is an angle exceeding the threshold value, and the threshold value is an inclination angle of a regression curve with 1/f fluctuation in which the power spectrum attenuates in inverse proportion to a frequency.

4. The prediction device according to claim 1, wherein the size of the region includes an area of the region, a length of a diagonal line of the region, or a length of one side of the region.

5. A prediction device comprising:

a camera configured to repeatedly image a region ahead of a given vehicle;

an extractor configured to extract a first region including a first other vehicle present in a first lane, the first lane being the same as that of the given vehicle, and a second region including a second other vehicle present in a second lane adjacent to the first lane from each of a plurality of images repeatedly captured by the camera; and a predictor configured to predict that a traffic jam will occur in a road on which there is the host vehicle based on a change in size of the first region extracted from each of the plurality of images by the extractor between the images and a change in size of the second region extracted from each of the plurality of images by the extractor between the images, wherein the predictor performs spectrum analysis on the change in size of the first region between the images to derive a first power spectrum from the change in size of the first region between the images, performs spectrum analysis on the change in size of the second region between the images to derive a second power spectrum from the change in size of the second region between the images, derives a regression line each of the first power spectrum and the second power spectrum, derives a first inclination angle, the first inclination angle being an inclination angle of the regression line of the first power spectrum, derives a second inclination angle, the second inclination angle being an inclination angle of the regression line of the second power spectrum, derives a regression line each of the first inclination angle and the second inclination angle, derives a third inclination angle, the third inclination angle being an inclination angle of the regression line of the first inclination angle, derives a forth inclination angle, the forth inclination angle being an inclination angle of the regression line of the second inclination angle, predicts that a traffic jam will occur on the road based on the third inclination angle and the forth inclination angle.

6. A prediction method comprising steps of:

extracting, by a computer mounted in a host vehicle including a camera configured to repeatedly image a region ahead of the host vehicle, a region including other vehicles from each of a plurality of images repeatedly captured by the camera; and predicting, by the computer, that a traffic jam will occur in a road on which there is the host vehicle based on a change in size of the region extracted from each of the plurality of images between the images, wherein the predicting step involves performing, by the computer, spectrum analysis on the change in size of the region between the images to derive a power spectrum from the change in size of the region between the images, deriving, by the computer, a regression line of the power spectrum, deriving, by the computer, a first inclination angle, the first inclination angle being an inclination angle of the regression line of the power spectrum, deriving, by the computer, a regression line of the first inclination angle, deriving, by the computer, a second inclination angle, the second inclination angle being an inclination angle of the regression line of the first inclination angle, and predicting, by the computer, that a traffic jam will occur on the road based on the second inclination angle.

7. A computer-readable non-transitory storage medium storing a program, the program causing a computer mounted in a vehicle including a camera configured to repeatedly image a region ahead of the vehicle to perform steps of:

extracting a region including other vehicles from each of a plurality of images repeatedly captured by the camera; and predicting that a traffic jam will occur in a road on which there is the host vehicle based on a change in size of the region extracted from each of the plurality of images between the images, wherein the predicting step involves performing spectrum analysis on the change in size of the region between the images to derive a power spectrum from the change in size of the region between the images, deriving a regression line of the power spectrum, deriving a first inclination angle, the first inclination angle being an inclination angle of the regression line of the power spectrum, deriving a regression line of the first inclination angle, deriving a second inclination angle, the second inclination angle being an inclination angle of the regression line of the first inclination angle, and predicting that a traffic jam will occur on the road on the basis of the second inclination angle.

* * * * *